(12) United States Patent
Lin (10) Patent No.: US 10,219,589 B1
(45) Date of Patent: Mar. 5, 2019

(54) SWIVEL (71) Applicant: Shu-Chan Lin, Tainan (TW)

(72) Inventor: Shu-Chan Lin, Tainan (TW)

(*) Notice: Subject to any disclaimer, the term of this patent is extended or adjusted under 35 U.S.C. 154(b) by 0 days.

(21) Appl. No.: 15/881,851

(22) Filed: Jan. 29, 2018

(51) Int. Cl.
*A44B 13/00* (2006.01)
*F41C 33/00* (2006.01)
*F16G 15/08* (2006.01)

(52) U.S. Cl.
CPC .......... *A44B 13/0029* (2013.01); *F16G 15/08* (2013.01); *F41C 33/002* (2013.01)

(58) Field of Classification Search
CPC ...... A44B 13/0029; F41C 3/002; F16G 15/08
See application file for complete search history.

(56) References Cited

U.S. PATENT DOCUMENTS

| | | | | |
|---|---|---|---|---|
| 2,639,480 A * | 5/1953 | Magid | ..................... | F41C 23/02 24/2.5 |
| 3,297,293 A * | 1/1967 | Andrews | ................. | B66C 1/666 24/115 K |
| 3,346,284 A * | 10/1967 | Petersen | ................. | F16G 15/08 403/165 |
| 3,704,537 A * | 12/1972 | McKinzie | ............... | F41C 23/02 42/85 |
| 4,431,352 A * | 2/1984 | Andrews | ................... | B66C 1/66 248/499 |
| 4,454,675 A * | 6/1984 | Ives | ........................ | F41C 23/02 42/85 |
| 4,558,979 A * | 12/1985 | Andrews | ................... | B66C 1/66 248/499 |
| 4,841,658 A * | 6/1989 | Katsenes | ................. | F41C 23/02 42/85 |
| 4,858,977 A * | 8/1989 | Mitchell | ................... | B66C 1/34 294/82.1 |
| 5,067,267 A * | 11/1991 | Ives | ........................ | F41C 23/02 224/150 |
| 5,074,069 A * | 12/1991 | Shire | ....................... | F41C 23/02 42/85 |
| 5,352,056 A * | 10/1994 | Chandler | .................. | B66C 1/66 294/82.1 |
| 5,975,786 A * | 11/1999 | Chang | ...................... | B66C 1/66 116/212 |
| 6,032,993 A * | 3/2000 | Kwon | ....................... | B66C 1/66 294/215 |
| D444,201 S * | 6/2001 | Norris, Sr. | .................. | D22/108 |

(Continued)

*Primary Examiner* — Robert Sandy
*Assistant Examiner* — David M Upchurch
(74) *Attorney, Agent, or Firm* — Osha Liang LLP (57) ABSTRACT

A swivel has a main body, a longitudinal locking unit, and a lateral locking unit. The main body has a longitudinal axis, a lateral axis being perpendicular to the longitudinal axis, an accommodating gap, a through hole, a threaded hole, and a receiving space. The accommodating gap is disposed between and communicates with the through hole and the threaded hole. The receiving space is disposed along the lateral axis and communicates with the through hole. The longitudinal locking unit has a shaft mounted through the through hole and screwed with the threaded hole. The lateral locking unit has a lateral locking component mounted in the receiving space and able to block the shaft to prevent the shaft from falling off from the accommodating gap. The swivel is capable of multiple locking manners to securely connect a belt and a heavy object.

9 Claims, 12 Drawing Sheets

(56) References Cited

U.S. PATENT DOCUMENTS

| | | | | |
|---|---|---|---|---|
| 6,354,034 B1* | 3/2002 | Norris, Sr. | ............. | F41C 23/02 |
| | | | | 42/85 |
| 6,953,212 B2* | 10/2005 | Alba | ........................ | B66C 1/66 |
| | | | | 294/217 |
| 7,654,028 B1* | 2/2010 | Grover | .................... | F41C 23/02 |
| | | | | 224/150 |
| 9,157,699 B2* | 10/2015 | Ward | .................... | F41C 33/002 |
| 2003/0046853 A1* | 3/2003 | Norris | ................. | A44B 11/006 |
| | | | | 42/85 |
| 2006/0254113 A1* | 11/2006 | Esch | ....................... | F41C 23/02 |
| | | | | 42/85 |
| 2007/0261284 A1* | 11/2007 | Keng | ..................... | F41C 23/04 |
| | | | | 42/73 |
| 2010/0199541 A1* | 8/2010 | Vest | ........................ | F41C 23/02 |
| | | | | 42/85 |
| 2015/0300399 A1* | 10/2015 | Ivanic | ................... | B60P 7/0807 |
| | | | | 411/192 |

* cited by examiner

SWIVEL

BACKGROUND OF THE INVENTION

1. Field of the Invention

The present invention relates to a swivel to connect two objects, and more particularly to a swivel with triple locking mechanisms for connecting heavy objects.

2. Description of Related Art

A swivel is a coupling device to connect two objects and to allow the two objects to pivot relative to each other.

Figure 11:
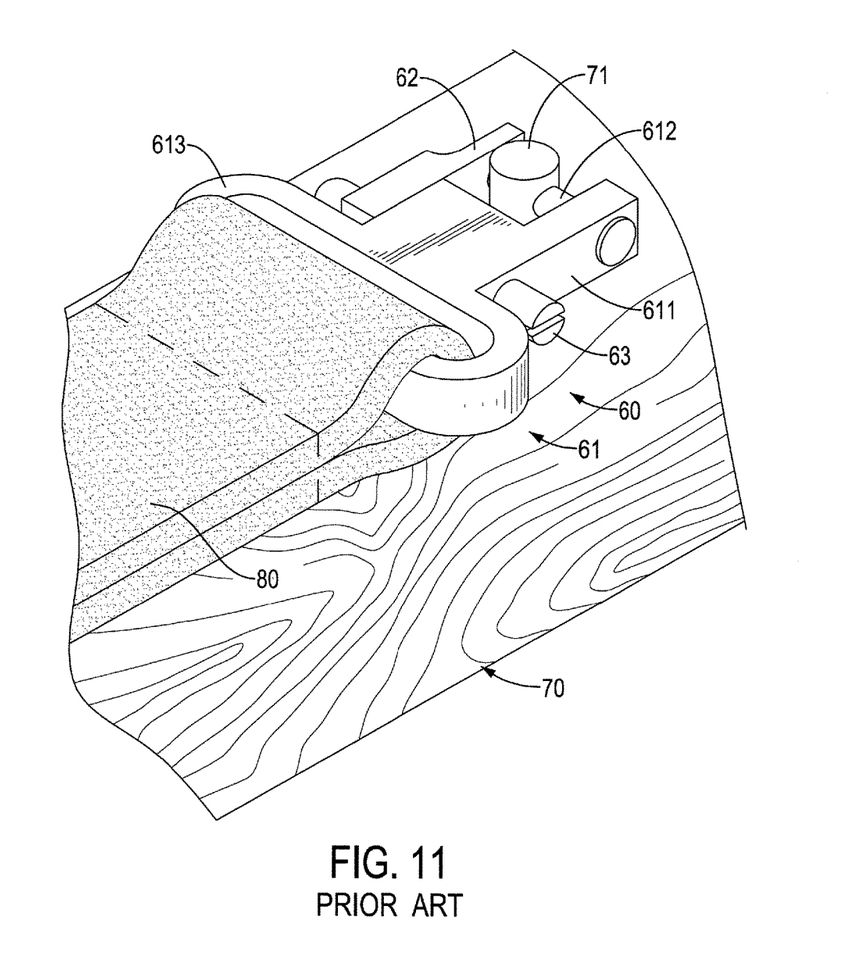
FIG. 11 is a perspective view of a swivel in accordance with the prior art.
Figure 12:
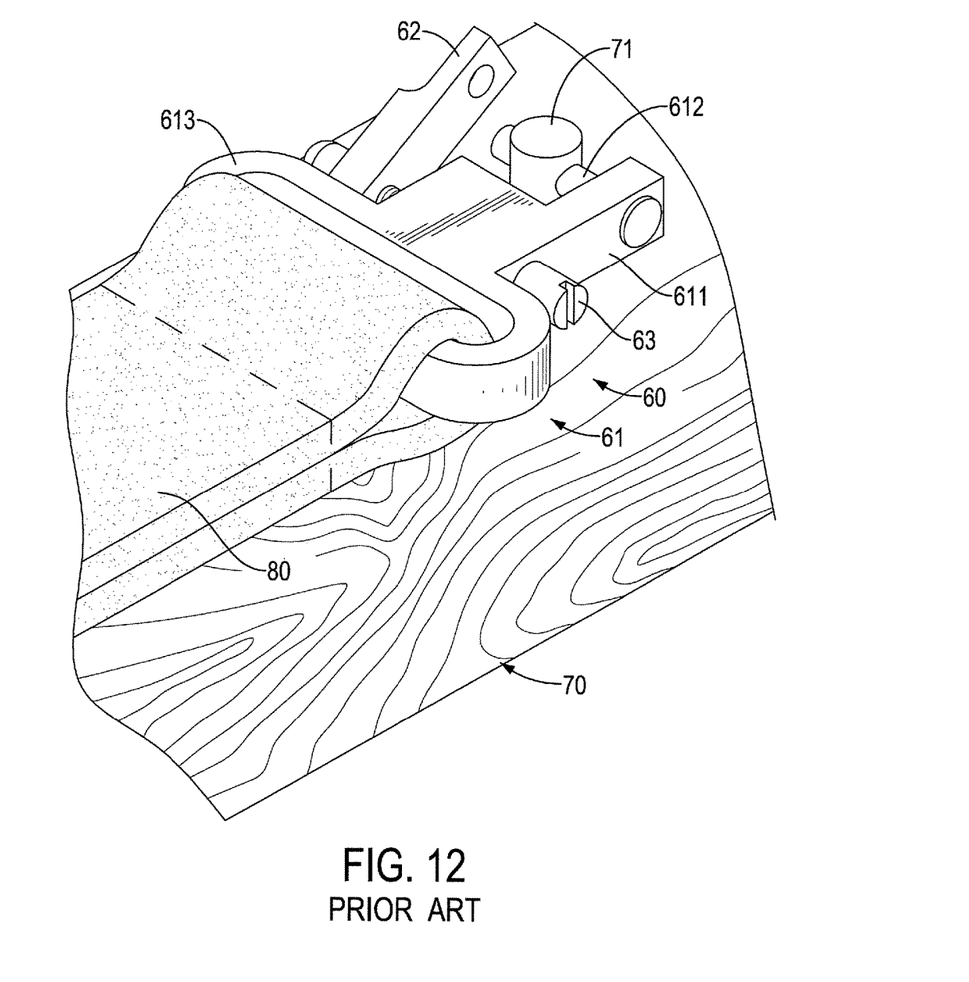
FIG. 12 is another perspective view of the swivel in FIG. 11.

With reference to FIGS. 11 and 12, a conventional swivel 60 is connected to a first object 70 with an assembling mount 71 and a second object 80. For instance, the first object 70 may be a gunstock, and the second object 80 may be a gun sling. The swivel 60 has a first component 61, a second component 62, and a locking screw 63. The first component 61 has a connecting portion 611, a pivoting pin 612, and a ring portion 613. The connecting portion 611 has two opposite ends. The pivoting pin 612 has two opposite ends, and one of the two opposite ends of the pivoting pin 612 is fixed to one of the two opposite ends of the connecting portion 611. The pivoting pin 612 is mounted through the assembling mount 71 of the first object 70. The ring portion 612 is formed at the other one of the two opposite ends of the connecting portion 611. The ring portion 612 is designed for the second object 80 such as the gun sling to pass through.

The second component 62 is mounted to the other one of the two opposite ends of the pivoting pin 612. The locking screw 63 is mounted through the connecting portion 611 of the first component 61 and is screwed with the second component 62. Since the pivoting pin 612 is mounted through the assembling mount 71 of the first object 70, the first object 70 and the second object 80 are able to rotate relative to each other via the swivel 60 pivotally connected to the first object 70.

However, the conventional swivel 60 depends only on the locking screw 63 to prevent the swivel 60 from detaching from the first object 70. Once the conventional swivel 60 is utilized to connect a heavy duty object, the locking screw 63 might not be able to sustain the weight of the heavy duty object, and the conventional swivel 60 is prone to detach from the heavy duty object.

To overcome the shortcomings of the conventional swivel, the present invention provides a swivel with triple locking mechanisms to mitigate or obviate the aforementioned problems.

SUMMARY OF THE INVENTION

The main objective of the present invention is to provide a swivel that may be applied to connect heavy objects.

The swivel comprises a main body, a longitudinal locking unit, and a lateral locking unit. The main body has a longitudinal axis, a lateral axis being perpendicular to the longitudinal axis, an accommodating gap, a through hole, a threaded hole, and a receiving space. The accommodating gap is disposed between and communicates with the through hole and the threaded hole. The receiving space is disposed along the lateral axis and communicates with the through hole. The longitudinal locking unit has a shaft mounted through the through hole and screwed with the threaded hole. The lateral locking unit has a lateral locking component mounted in the receiving space and is capable of blocking the shaft to prevent the shaft from moving out from the accommodating gap. The swivel in accordance with the present invention has multiple locking manners to securely connect a belt and a heavy object.

Other objects, advantages, and novel features of the invention will become more apparent from the following detailed description when taken in conjunction with the accompanying drawings.

DETAILED DESCRIPTION OF PREFERRED EMBODIMENTS

Figure 1:
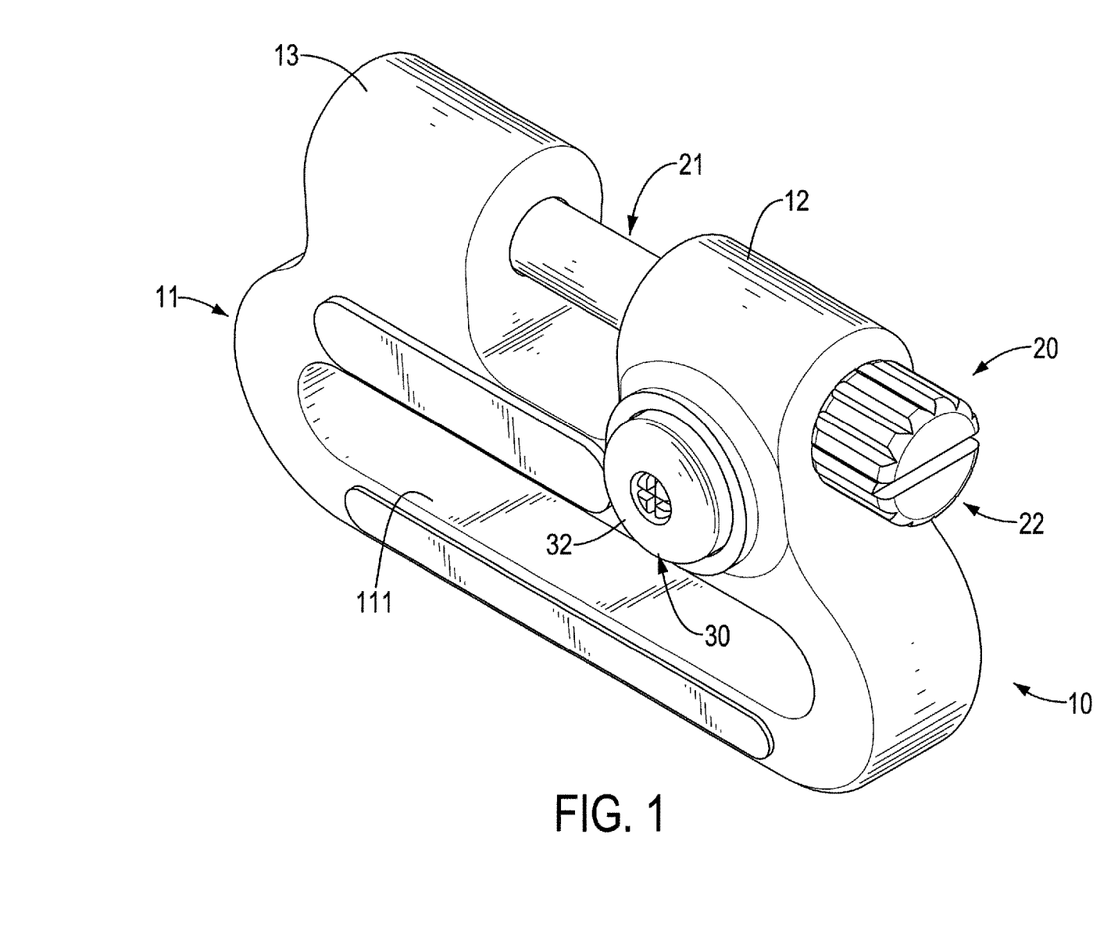
FIG. 1 is a perspective view of a swivel in accordance with the present invention.
Figure 2:
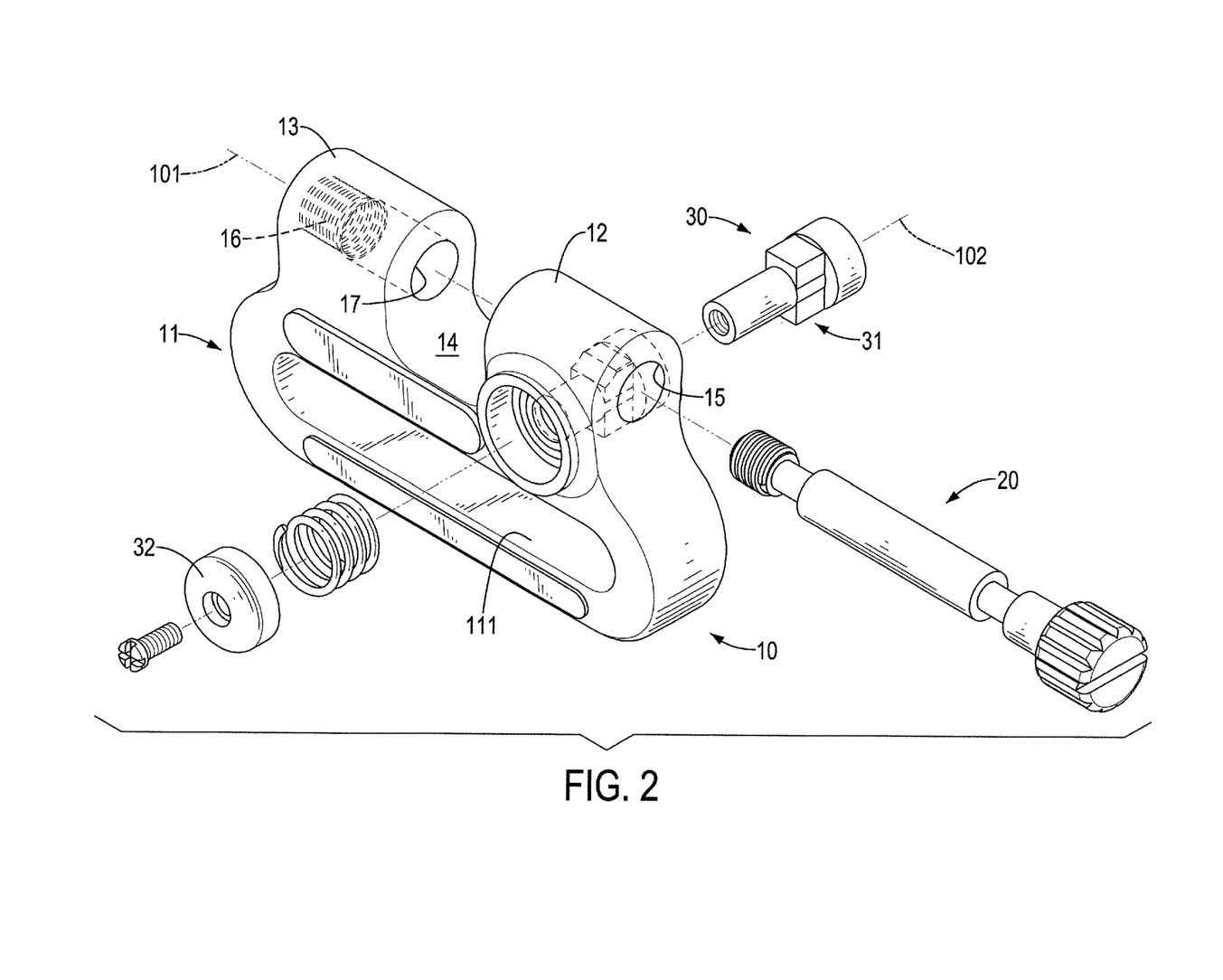
FIG. 2 is an exploded perspective view of the swivel in FIG. 1.

With reference to FIGS. 1 and 2, a swivel in accordance with the present invention has a main body 10, a longitudinal locking unit 20, and a lateral locking unit 30. The longitudinal locking unit 20 and the lateral locking unit 30 are mounted to the main body 10.

Figure 3:
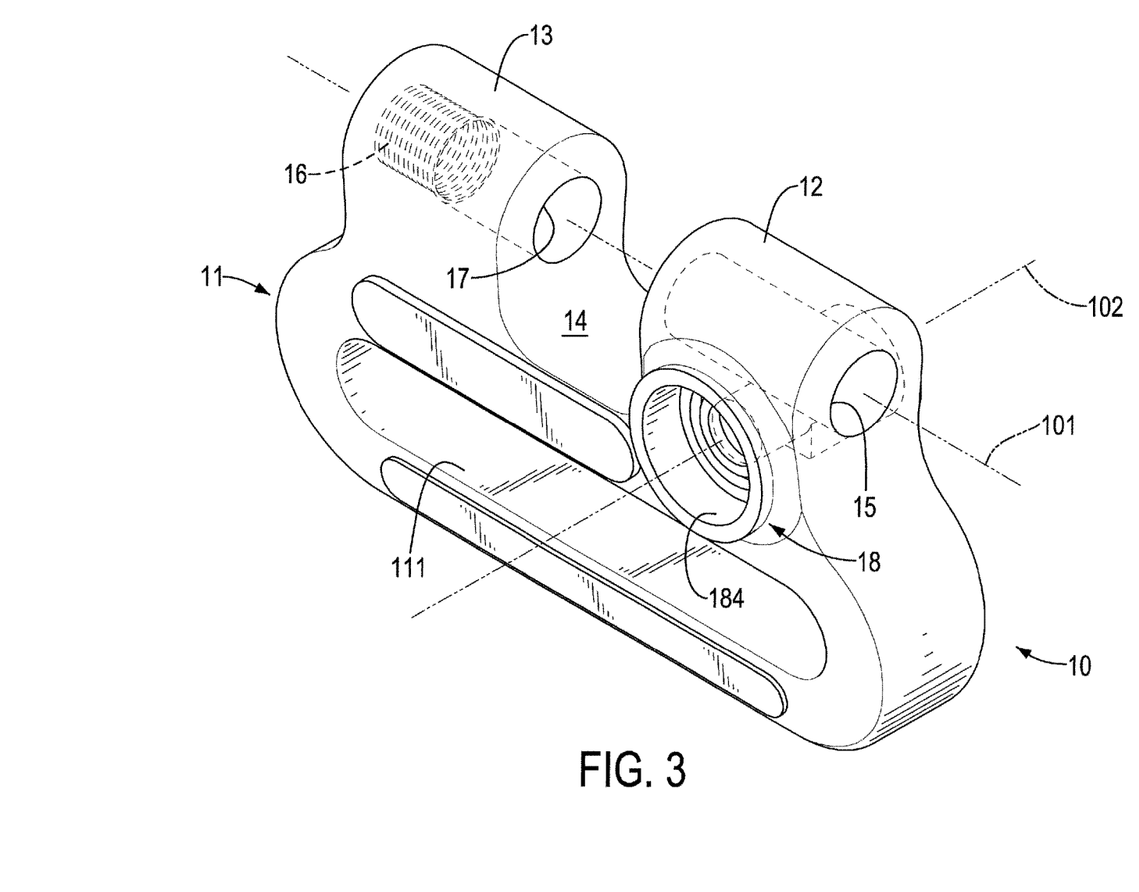
FIG. 3 is a perspective view of a main body of the swivel in FIG. 1.
Figure 6:
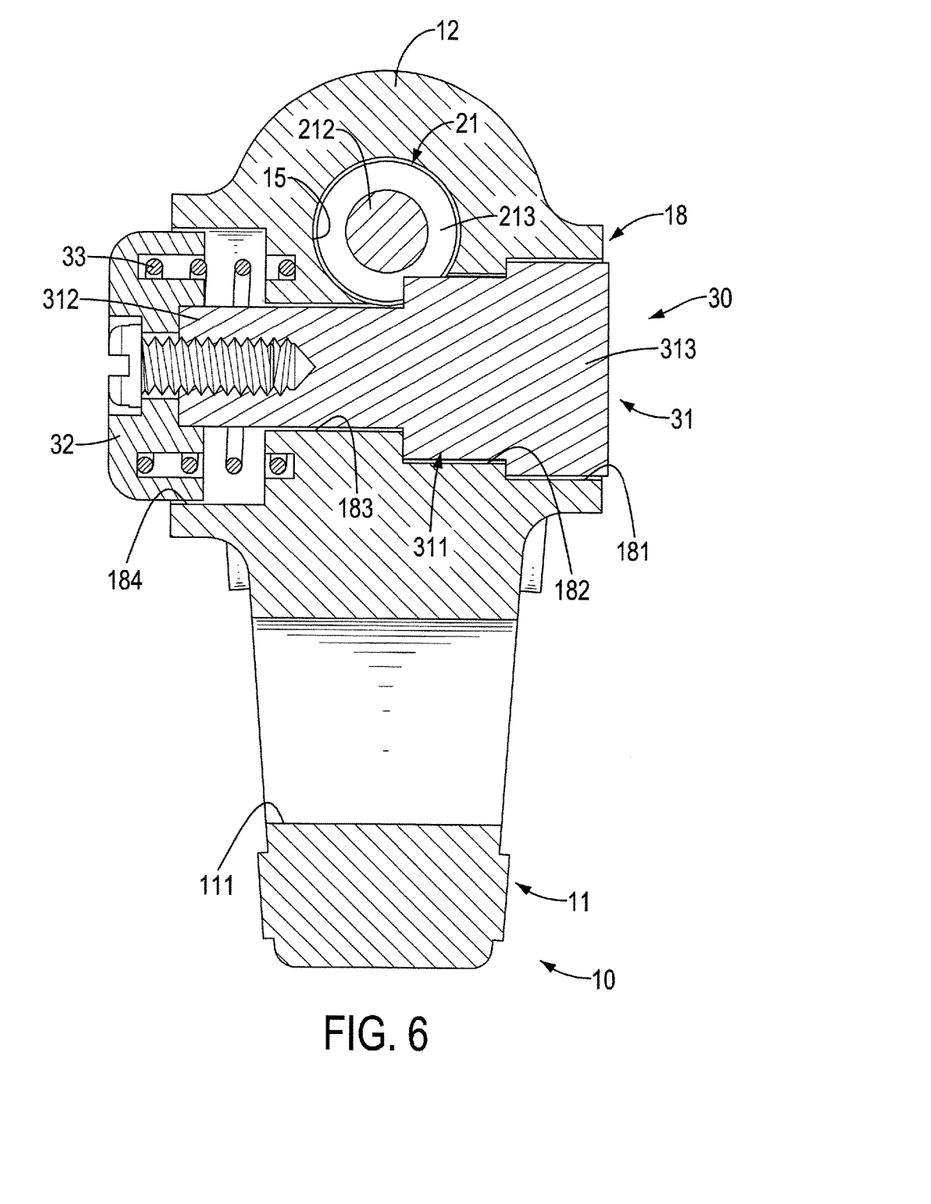
FIG. 6 is a cross sectional side view of the swivel in FIG. 1.
Figure 7:
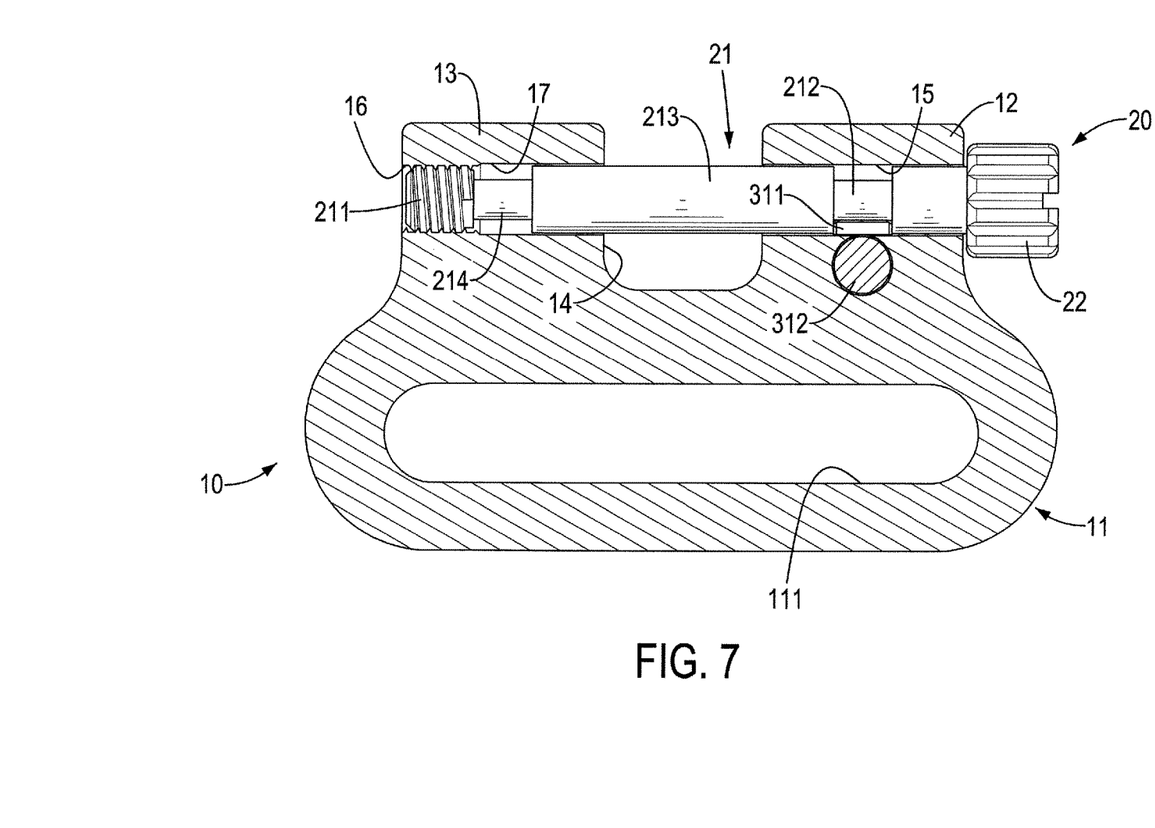
FIG. 7 is another cross sectional side view of the swivel in FIG. 1.
Figure 8:
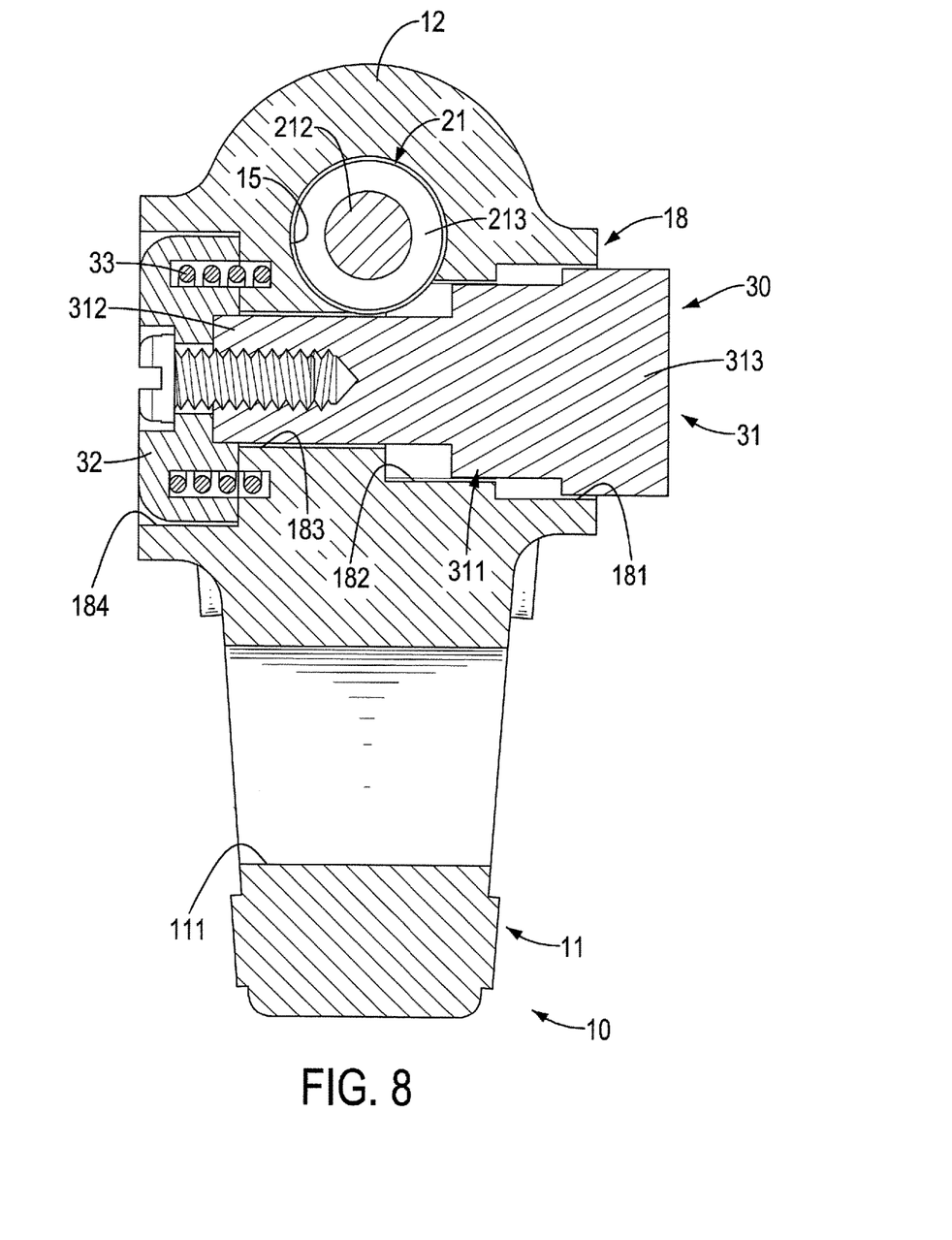
FIG. 8 is a further cross sectional side view of the swivel in FIG. 1, showing a press button being pressed.

With reference to FIGS. 3, 6, and 7, the main body 10 has a longitudinal axis 101, a lateral axis 102, a ring portion 11, a mounting portion 12, a screwing portion 13, an accommodating gap 14, a through hole 15, a threaded hole 16, a connecting hole 17, and a receiving space 18. The longitudinal axis 101 and the lateral axis 102 of the main body 10 are perpendicular to each other. The ring portion 11 has a passing hole 111 formed through the ring portion 11 along a direction that is parallel to the lateral axis 101 of the main body 10. The passing hole 111 is an elongated hole extending along a direction that is parallel to the longitudinal axis 101 of the main body 10. The mounting portion 12 is connected to the ring portion 11. The screwing portion 13 is connected to the ring portion 11.

The accommodating gap 14 is disposed between the mounting portion 12 and the screwing portion 13. The through hole 15 is formed through the mounting portion 12 along the longitudinal axis 101 of the main body 10, communicates with the accommodating gap 14, and has a diameter. The threaded hole 16 is disposed in the screwing portion 13 and is aligned with the through hole 15. The connecting hole 17 is disposed in the screwing portion 13, is disposed between the threaded hole 16 and the accommodating gap 14, coaxially communicates with the threaded hole 16, and communicates with the accommodating gap 14. The threaded hole 16 communicates with the accommodating gap 14 via the connecting hole 17.

With reference to FIGS. 3 and 6, the receiving space 18 is disposed in the mounting portion 12 along the longitudinal axis 101 of the main body 10 and has an inserting hole 181, a limiting recess 182, a linking channel 183, and an activating recess 184. The inserting hole 181 is defined in the mounting portion 12 and has a bottom. The limiting recess 182 is defined in the bottom of the inserting hole 181. The limiting recess 182 has a bottom and two guiding grooves 1821. The two guiding grooves 1821 face to each other and extend along a direction that is parallel to the lateral axis 102 of the main body 10. In the embodiment of the present invention, the limiting recess 182 has a rectangular contour. The linking channel 183 is defined in the bottom of the limiting recess 182. The activating recess 184 is defined in the mounting portion 12. The activating recess 184 and the inserting hole 181 are opposite each other along the lateral axis 102 of the main body 10. The linking channel 183 communicates with the limiting recess 182 and the activating recess 184.

Figure 4:
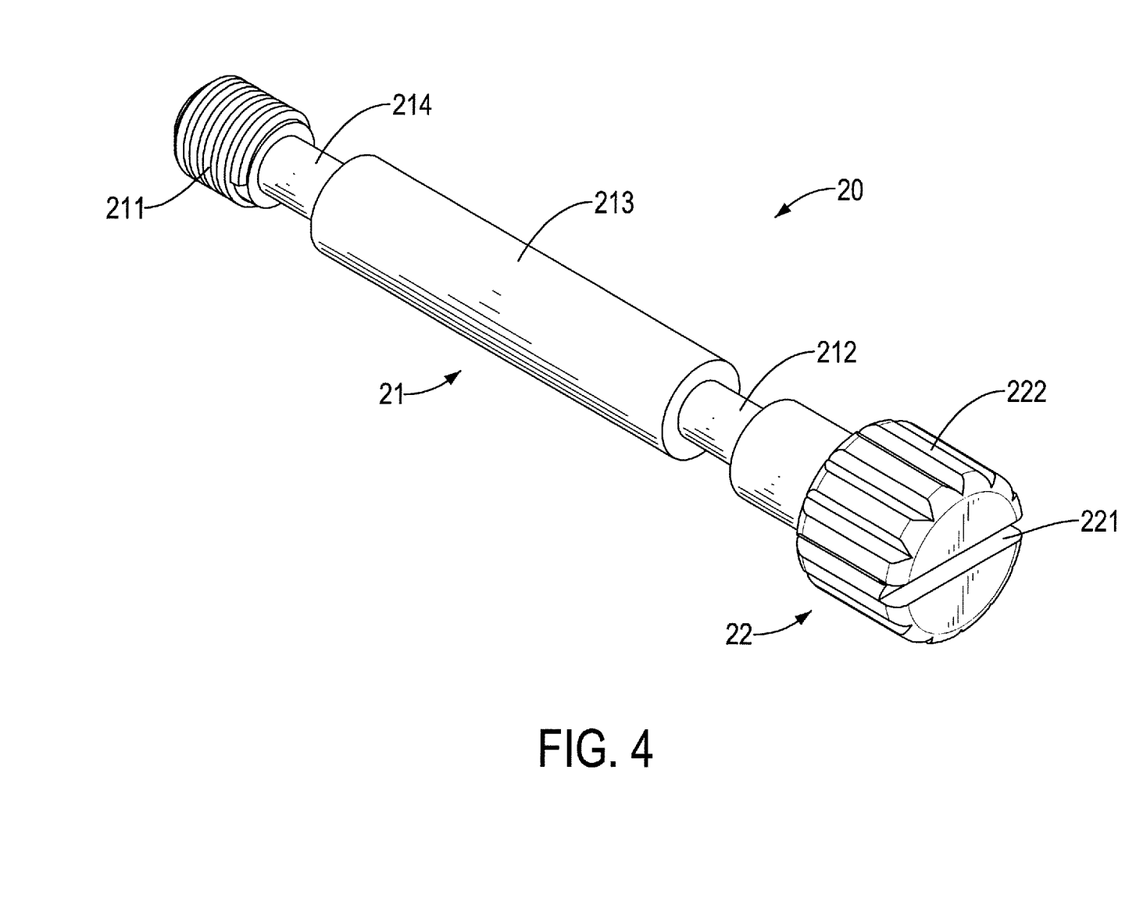
FIG. 4 is a perspective view of a longitudinal locking unit of the swivel hi FIG. 1.

With reference to FIGS. 2, 4, and 7, the longitudinal locking unit 20 has a shaft 21 and an operating head 22. The shaft 21 is mounted through the through hole 15 and has a peripheral surface, two ends, a threaded section 211, an escape indention 212, a blocking section 213, and an annular groove 214. The threaded section 211 is disposed at one of the two ends of the shaft 21. The threaded section 211 has a thread formed on the peripheral surface of the shaft 21. The escape indention 212 is formed in the peripheral surface of the shaft 21 and is disposed adjacent to the other one of the two ends of the shaft 21. In the embodiment of the present invention, the invading indention 212 is a groove that is annularly formed in the peripheral surface of the shaft 21. The blocking section 213 is disposed alongside the escape indention and has a diameter smaller than the diameter of the through hole 15. The annular groove 214 is formed in the peripheral surface of the shaft 21 and is disposed between the threaded section 211 and the blocking section 213. The shaft 21 passes through the accommodating gap 14, and the threaded section 211 is threaded with the threaded hole 16.

With reference to FIGS. 2 and 4, the operating head 22 has a peripheral surface, two opposite ends, a socket 221, and multiple anti-slip grooves 222. One of the two opposite ends of the operating head 22 is connected to the shaft 21. The socket 221 is formed in the other one of the two opposite ends of the operating head 22. The socket 221 is a hand tool to be inserted therein. The multiple anti-slip grooves 222 are formed in the peripheral surface of the operating head 22.

Figure 5:
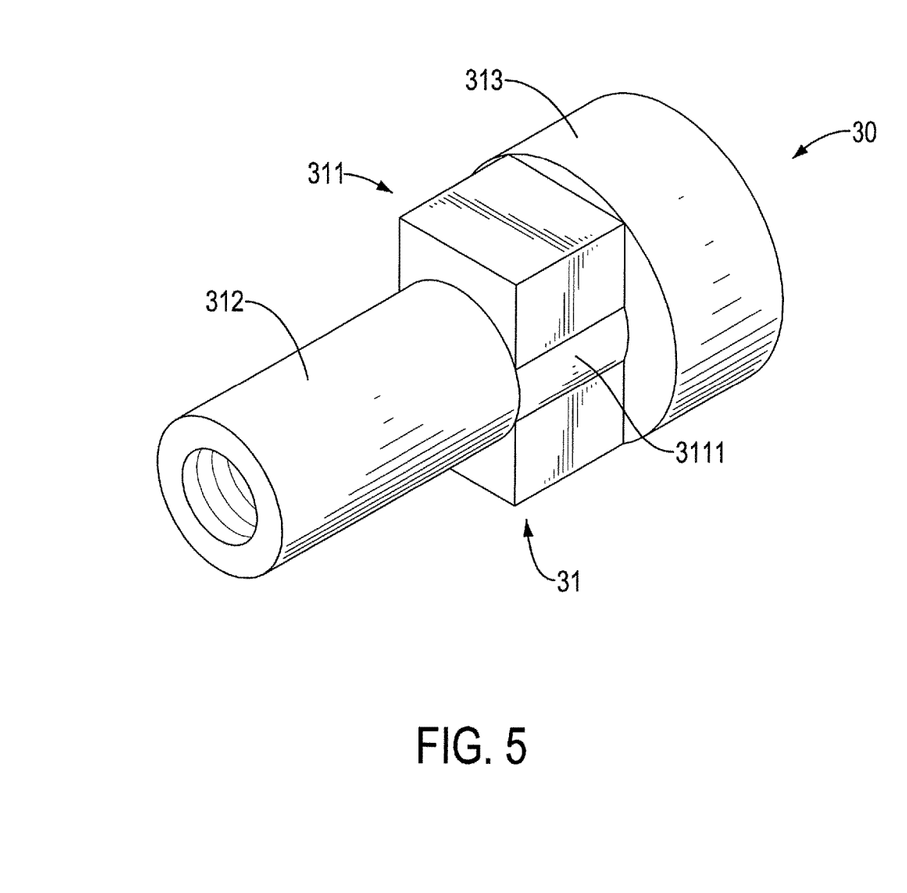
FIG. 5 is a perspective view of a lateral locking unit of the swivel in FIG. 1.

With reference to FIGS. 2, 5, and 7, the lateral locking unit 30 has a lateral locking component 31, a press button 32, and an elastic unit 33. The lateral locking component 31 has a limiting block 311, a connecting rod 312, and a blocking head 313. A contour of the limiting block 311 is designed according to the contour of the limiting recess 182 of the receiving space 18. In the embodiment of the present invention, the limiting block 311 is a cuboid and has two side faces facing to opposite directions and two guiding protrusions 3111 respectively formed on the two side faces of the limiting block 311. Each one of the two guiding protrusions 3111 extends along a direction that is parallel to the lateral axis 102 of the main body 10. The connecting rod 312 is connected to the limiting block 311. The blocking head 313 is connected to the limiting block 311 and is distal from the connecting rod 312 and makes the limiting block 311 disposed between the connecting rod 312 and the blocking head 313.

The lateral locking component 31 is mounted in the receiving space 18 of the main body 10. The limiting block 311 is mounted in the limiting recess 182 and is able to block the blocking section 213 of the shaft 21. The two guiding protrusions 3111 are respectively disposed in the two guiding grooves 1821 and are able to respectively slide along the two guiding grooves 1821 and make the limiting block 311 steadily move along the lateral axis 102 of the main body 10. The connecting rod 312 passes through the linking channel 183 and extends into the activating recess 184. The blocking head 313 is received in the inserting hole 181. The press button 32 is connected to the connecting rod 312 and is disposed in the activating recess 184. The elastic unit 33 has two opposite ends. In the embodiment of the present invention, the elastic unit 33 is a compression spring. The elastic unit 33 is disposed in the activating recess 184 and is mounted on and around the connecting rod 312. One of the two opposite ends of the elastic unit 33 abuts against the mounting portion 12. The other one of the two opposite ends of the elastic unit 33 abuts against the press button 32.

With reference to FIG. 1, the passing hole 111 of the ring portion 11 can allow a gun sling to pass through. The accommodating gap 14 is designed for receiving an assembling mount connected to a gunstock. With reference to FIGS. 6 to 9, when the press button 32 of the lateral locking unit 30 is pressed, the elastic unit 33 is compressed, and the lateral locking component 31 connected to the press button 32 is pushed and moves along the lateral axis 102 of the main body 10. The limiting block 311 of the lateral locking component 31 leaves the escape indention 212 of the shaft 21 and unblocks the blocking section 213 of the shaft 21. The shaft 21 is rotated and the threaded section 211 of the shaft 21 is unscrewed with the threaded hole 16. Since the limiting block 311 is no longer blocking the blocking section 213, the shaft 21 is able to move along the longitudinal axis 101 and toward the mounting portion 12.

Figure 9:
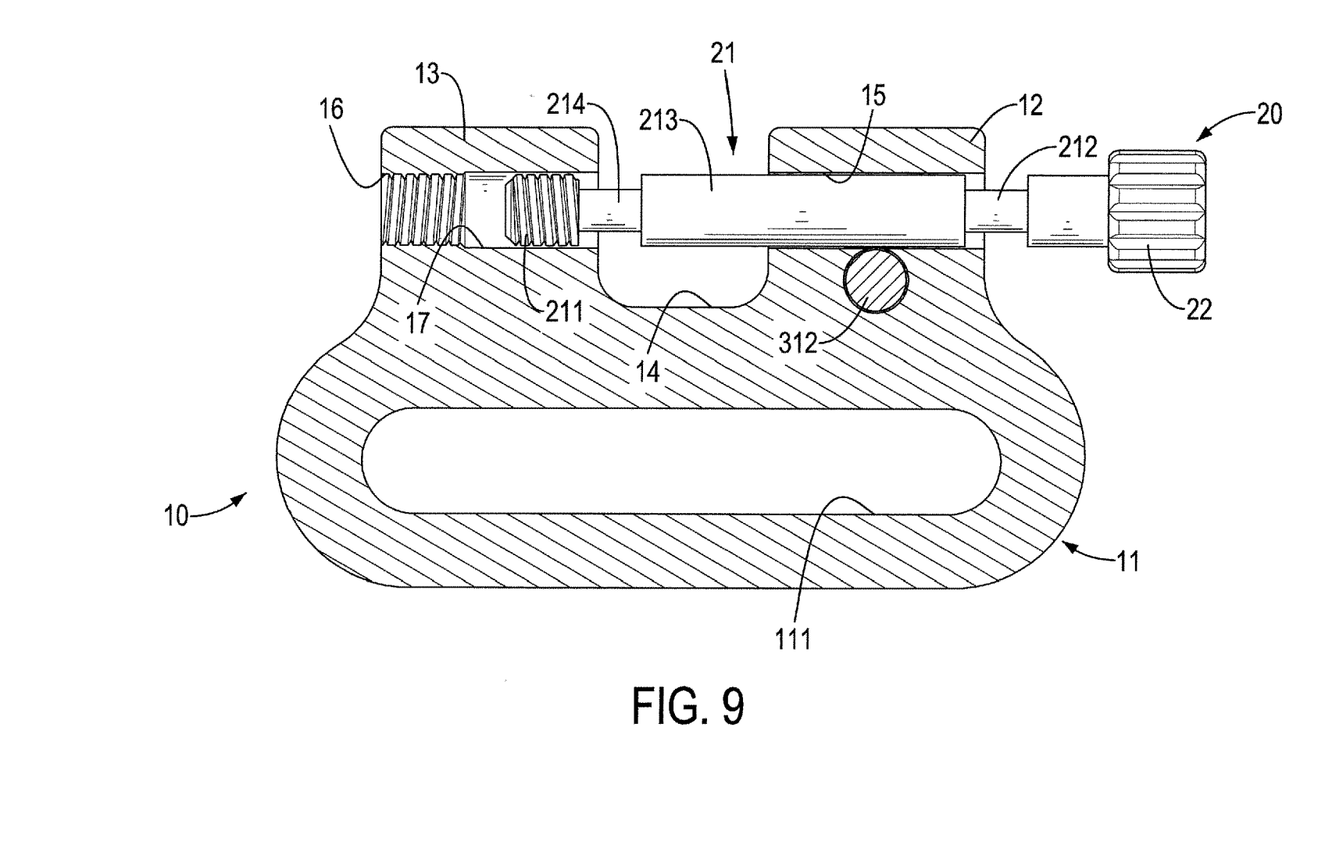
FIG. 9 is another cross sectional side view of the swivel in FIG. 1, showing a threaded section being detached from a threaded hole.
Figure 10:
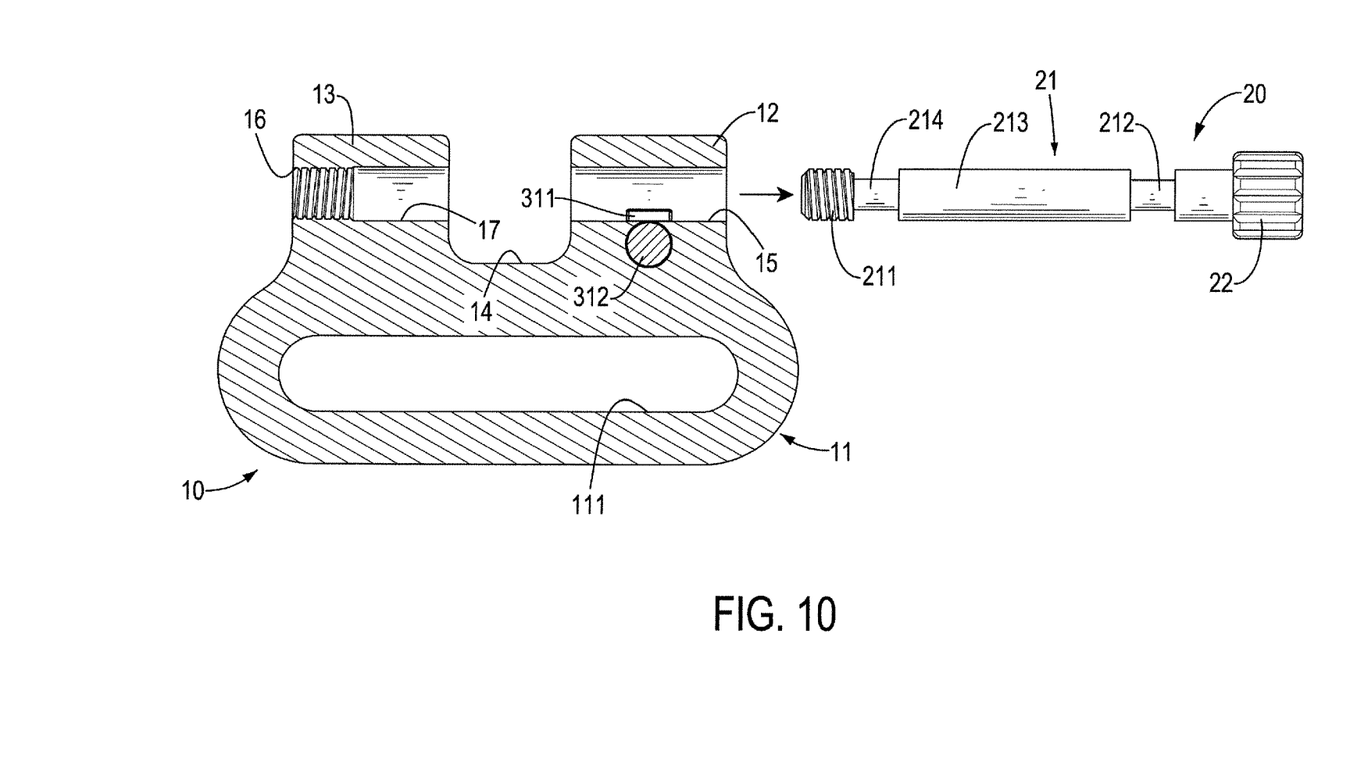
FIG. 10 is another cross sectional side view of the swivel in FIG. 1, showing the longitudinal locking unit being detached from the main body.

When the accommodating gap 14 is disposed to the assembling mount connected to the gunstock, the shaft 21 is mounted through the assembling mount and is inserted through the connecting hole 17. Then, the threaded section 211 of the shaft 21 is threaded with the threaded hole 16 again. The press button 32 is released, the elastic unit 33 restores and pushes the pushing button 32 to move back. The limiting block 311 blocks the blocking section 213 again.

Eventually, the swivel in accordance with the present invention is connected to the assembling mount connected to the gunstock and securely connects both the gun sling and the gunstock. The swivel is detached from the gunstock only when the limiting block 311 unblocks the blocking section 213, the threaded section 211 is unscrewed with the threaded hole 16, and the shaft 21 moves out from the accommodating gap 14 entirely. With the multiple locking manners, the swivel in accordance with the present invention is able to connect a belt and a heavy object, preventing the belt and the heavy object detaching from each other unintentionally.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A swivel comprising:
    a main body having
        a longitudinal axis;
        a lateral axis being perpendicular to the longitudinal axis of the main body;
        a ring portion with a passing hole formed through the ring portion along a direction that is parallel to the lateral axis of the main body;
        a mounting portion connected to the ring portion;
        a screwing portion connected to the ring portion;
        an accommodating gap disposed between the mounting portion and the screwing portion;
        a through hole formed through the mounting portion along the longitudinal axis of the main body and communicating with the accommodating gap;
        a threaded hole disposed in the screwing portion, aligned with the through hole, and communicating with the accommodating gap; and
        a receiving space disposed in the mounting portion along the lateral axis of the main body and having
            a limiting recess disposed in the mounting portion along the lateral axis of the main body and communicating with the through hole; and
            a linking channel disposed in the mounting portion along the lateral axis of the main body and communicating with the limiting recess;
    a longitudinal locking unit having
        a shaft mounted through the through hole and having
            a peripheral surface;
            two ends disposed opposite each other along the longitudinal axis of the main body;
            a threaded section disposed at one of the two ends of the shaft and capable of being threaded with the threaded hole;
            an escape indention formed in the peripheral surface of the shaft and disposed adjacent to the other one of the two ends of the shaft; and
            a blocking section disposed alongside the escape indention; and
    a lateral locking unit having
        a lateral locking component mounted in the receiving space and having
            a limiting block mounted in the limiting recess and capable of blocking the blocking section; and
            a connecting rod connected to the limiting block and mounted through the linking channel;
        a press button connected to the connecting rod;
        an elastic unit mounted on and around the connecting rod and having two opposite ends;
        one of the two opposite ends of the elastic unit abutting against the mounting portion; and
        the other one of the two opposite ends of the elastic unit abutting against the press button.

2. The swivel as claimed in claim 1, wherein the escape indention is a groove annularly formed in the peripheral surface of the shaft.

3. The swivel as claimed in claim 2, wherein
    the limiting recess has a rectangular contour; and
    the limiting block is a cuboid with a contour fitting the rectangular contour of the limiting recess.

4. The swivel as claimed in claim 3, wherein
    the limiting recess has two guiding grooves facing to each other and extending along a direction that is parallel to the lateral axis of the main body;
    the limiting block has two side faces facing to opposite directions and two guiding protrusions respectively formed on the two side faces of the limiting block; and
    the two guiding protrusions are respectively disposed in the two guiding grooves and are capable of respectively sliding along the two guiding grooves.

5. The swivel as claimed in claim 4, wherein
    the main body has a connecting hole disposed in the screwing portion, coaxially communicating with the threaded hole, and communicating with the accommodating gap; and
    the threaded hole communicates with the accommodating gap via the connecting hole.

6. The swivel as claimed in claim 5, wherein
    the receiving space has
        an inserting hole defined in the mounting portion and having a bottom; and
        an activating recess defined in the mounting portion and disposed opposite the inserting hole along the lateral axis of the main body;
    the linking channel communicates with the limiting recess and the activating recess;
    the lateral locking component has a blocking head connected to the limiting block, being distal from the connecting rod, and disposed in the inserting hole; and
    the press button is disposed in the activating recess.

7. The swivel as claimed in claim 6, wherein
    the shaft has an annular groove formed in the peripheral surface of the shaft; and
    the annular groove is disposed between the threaded section and the blocking section.

8. The swivel as claimed in claim 7, wherein the elastic unit is a compression spring.

9. The swivel as claimed in claim 8, wherein
    the longitudinal locking unit has an operating head having
        a peripheral surface;
        two opposite ends;
        one of the two opposite ends of the operating head connected to the shaft;
        a socket formed in the other one of the two opposite ends of the operating head; and
        multiple anti-slip grooves formed in the peripheral surface of the operating head.

* * * * *